United States Patent
Krupp et al.

(10) Patent No.: US 8,196,956 B1
(45) Date of Patent: Jun. 12, 2012

(54) PRESSURE VESSEL FOR A GAS GENERATING SYSTEM

(75) Inventors: Robert M. Krupp, Rochester, MI (US); Bruce A. Stevens, Oakland, MI (US)

(73) Assignee: TK Holdings, Inc., Armada, MI (US)

( * ) Notice: Subject to any disclaimer, the term of this patent is extended or adjusted under 35 U.S.C. 154(b) by 183 days.

(21) Appl. No.: 12/696,020

(22) Filed: Jan. 28, 2010

Related U.S. Application Data

(60) Provisional application No. 61/206,128, filed on Jan. 28, 2009.

(51) Int. Cl.
*B60R 21/26* (2011.01)
(52) U.S. Cl. .......................... 280/736; 280/741
(58) Field of Classification Search .................. 280/736, 280/737, 741; 220/562, 581, 582, 586
See application file for complete search history.

(56) References Cited

U.S. PATENT DOCUMENTS

| | | | | |
|---|---|---|---|---|
| 2,026,133 A * | 12/1935 | Mapes | ........................... | 220/581 |
| 3,024,938 A * | 3/1962 | Watter | ........................ | 220/4.12 |
| 7,481,897 B2 | 1/2009 | Erike | ........................... | 148/334 |
| 7,563,335 B2 | 7/2009 | Erike | ........................... | 148/650 |
| 2002/0033591 A1 | 3/2002 | Erike | ........................ | 280/743.1 |
| 2004/0074570 A1 | 4/2004 | Erike | ............................ | 148/546 |

* cited by examiner

*Primary Examiner* — Paul N Dickson
*Assistant Examiner* — Joselynn Y Sliteris
(74) *Attorney, Agent, or Firm* — L.C. Begin & Associates, PLLC.

(57) ABSTRACT

A pressure vessel for a gas generating system is provided. The vessel is formed from a material and has a first portion and a second portion. A property of the material along the first portion has a value within a first range, and the same property of the material along the second portion has a value within a second range different from the first range.

9 Claims, 2 Drawing Sheets

US 8,196,956 B1

PRESSURE VESSEL FOR A GAS GENERATING SYSTEM

CROSS REFERENCE TO RELATED APPLICATIONS

This application claims the benefit of provisional application Ser. No. 61/206,128, filed on Jan. 28, 2009.

BACKGROUND OF THE INVENTION

The present invention relates to pressure vessels and, more particularly, pressure vessels used for storing a pressurized fluid incorporated into a gas generating system.

Gas generating systems incorporating a pressurized fluid component (for example, hybrid gas generating systems) typically include a cylindrical pressure vessel for storing the pressurized fluid. Such a pressure vessel may have a first, closed end and a second, open end to which a mechanism for facilitating controlled release of the fluid is suitably attached. The closed end may be formed integrally with the vessel, or an end closure may be suitably attached to the otherwise open first end of the vessel.

In vessel designs including a gas release mechanism or end closure attached to an end of the vessel, the end of the vessel proximate the mechanism or end closure may be necked down (i.e. reduced in diameter) to preferentially direct any elevated pressure condition to the larger diameter interior of the vessel. As defined herein, an "elevated pressure condition" occurs when the vessel internal pressure exceeds the normal operating parameters of the vessel. However, necking may result in a vessel that is relatively longer and heavier than a straight-walled (non-necked) vessel would be. Such size and weight penalties are undesirable.

Thus, a need exists for an alternative method for directing effects of an elevated pressure condition to a predetermined portion of the pressure vessel.

SUMMARY OF THE INVENTION

In accordance with one aspect of the embodiments of the present invention, a unitary pressure vessel for a gas generating system is provided. The vessel is formed from a material and has a first portion and a second portion. A property of the material along the first portion has a value within a first range, and the same property of the material along the second portion has a value within a second range different from the first range.

In accordance with another aspect of the embodiments of the present invention, a method for controlling a material property of a selected portion of a pressure vessel for a gas generating system is provided. The method includes the step of thermally treating the selected portion of the vessel such that a value of the material property resides within a predetermined range.

In accordance with another aspect of the embodiments of the present invention, a pressure vessel for a gas generating system is provided. The vessel includes a first portion and a second portion attached to the first portion. A property of a material forming the first portion has a value within a first range, and the same property of a material forging the second portion has a value within a second range different from the first range.

DETAILED DESCRIPTION

Figure 1:
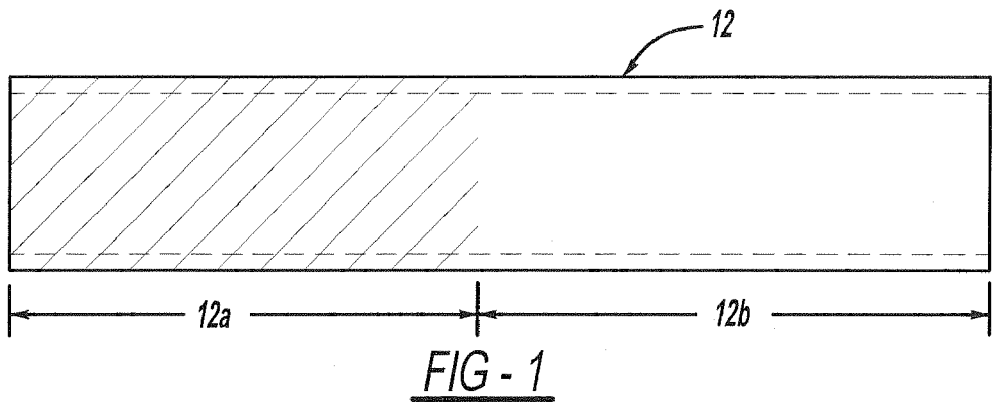
FIG. 1 is a side view of a pressure vessel in accordance with one embodiment of the present invention.

FIGS. 1-4 show side views of pressure vessels for use in a gas generating system, in accordance with various embodiments of the present invention. A pressure vessel as described herein may be open at both ends (e.g., vessels 12 and 14 in FIGS. 1 and 2, respectively) or the vessel may be formed as known in the art so as to have one closed end (e.g., vessels 16 and 18 in FIGS. 3 and 4, respectively).

In the embodiments shown in FIGS. 1-4, the pressure vessel is unitary (i.e., formed from a single, continuous piece of material. This piece of material may be fabricated into any of a variety of forms to produce the vessel. For example, the piece of material may be drawn, extruded, or formed and welded along a seam. A "pressure vessel" as defined herein is also understood to as being exclusive of any caps, end closures, or similar mechanisms formed separately from the vessel and designed to close or seal an open portion of the vessel.

The pressure vessel may be formed from a steel or any other alloy suitable for fabrication so as to perform the functions of a pressure vessel, and also suitable for selective thermal or heat treatment(s) directed to changing certain properties of the material forming a selected portion of the vessel. The definition of "thermal treatment" or "heat treatment" as used herein encompasses both the controlled application of heat to the vessel material as well as any subsequent treatment steps (for example, any quenching or cooling steps) required to impart the desired qualities to specified portions of the vessel material.

In embodiments of the pressure vessel described herein, the vessel generally includes a first portion and a second portion. A property of the vessel material along the first portion has a value within a first range, and the same property of the vessel material along the second portion has a value within a second range different from the first range. The material property along one of more of the first and second vessel portions may be controlled or modified so as to have a value residing within the corresponding range by selectively thermally treating one of more of the first and second vessel portions.

As used herein, the term "selective thermal treatment" or "selective heat treatment" is understood to mean that the thermal treatment is directed to a particular portion (or portions) of the vessel with a view to restricting the effects of the treatment to that portion (or portions) of the vessel.

For example, such selective thermal treatment(s) may act to increase the tensile or yield strength of the portion of the material to treatment, or the treatment(s) may act to decrease the tensile or yield strength of the exposed material. Alternatively, the selective thermal treatments may be designed to affect other material properties (such as toughness, hardness, ductility, etc.) of selected portions of the pressure vessel material. The thermal treatment (or treatments) used may be employed to affect properties through an entire cross-sectional thickness of the material, or the treatment(s) may affect only surface properties of the material. In this manner, the various properties of the material forming selected portions of the pressure vessel may be controlled to provide values of the material properties falling within a predetermined range, according to design requirements. Parameters of suitable thermal treatments (such as temperature, time at temperature, progression of heating and cooling phases in the thermal cycle, the composition of the atmosphere surrounding the pressure vessel during heat treatment, quenching or cooling parameters and procedures, and any other pertinent parameters may be known for the pressure vessel material used or may be iteratively developed taking into consideration such factors as the composition and condition of the pressure vessel material, the dimensions of the vessel, the desired material properties for the portion of the vessel undergoing heat treatment, the method used to apply heat to the vessel, and other pertinent factors. The parameters of the heat treatment are specified and controlled such that one or more key material properties are affected in the desired manner, while still ensuring that the treated pressure vessel is fully capable of performing all of its designed functions.

The suitability of any particular type of thermal treatment and the particular processing parameters for a given application will be determined by factors such as the composition and processing history of the material being treated, the thickness of the material cross-section(s), the desired end properties of the material, and other pertinent factors.

The selective thermal or heat treatment(s) applied to the pressure vessels described herein are generally directed to changing and controlling certain properties of the material forming a selected portion or portions of the pressure vessel, to aid in confining the effects of any vessel elevated pressure condition to specific, predetermined portions of the vessel.

By controlling selected material properties of selected portions of the pressure vessel material, portions of the vessel material having relatively lower tensile or yield strength are formed which effectively act as vents to release the elevated pressure when the pressure reaches a predetermined level. These vents can be positioned at predetermined locations along the vessel, thereby making the venting locations more predictable and obviating the need for necking of the pressure vessel as previously described.

In one particular embodiment, the thermal or heat treatment(s) applied to the pressure vessel is directed to affecting the tensile strength of the material. As used herein, the "tensile strength" of the material is understood to represent the ultimate tensile strength of the material being treated, which may be determined in testing by dividing the load on a sample of the material at failure of the sample by the original cross-sectional area of the material sample prior to the application of the load. Alternatively, this property of the material may be measured using any other suitable method.

In another particular embodiment, the thermal or heat treatment(s) applied to the pressure vessel is directed to affecting the yield strength of the material. The yield strength is understood to mean the maximum stress that can be developed in a material without causing plastic deformation. This parameter may be measured as the 0.2% offset yield strength as determinable from a stress-strain diagram of the material, in a manner known in the art.

In another particular embodiment, the thermal or heat treatment(s) applied to the pressure vessel is directed to affecting the percentage elongation (i.e., engineering strain at fracture) of the material. This property of the material may be measured using known methods.

Any suitable method of thermal treatment may be used provided that the heating effects may be directed to the specified portion(s) of the pressure vessel or the effects of the heating substantially restricted to the specified portion(s) of the pressure vessel, and also provided the method used may be adapted to impart the desired material properties to the predetermined portions of the vessel material. For example, any of a wide variety of hardening and/or softening methods are contemplated, depending on the composition of the material and other factors cited herein.

Selective thermal treatment of the vessel material can also be facilitated by masking portions of the vessel so as to prevent, delay, or reduce the severity of exposure of selected portions of the vessel to elevated temperatures during processing. In one example, portions of the vessel are covered prior to heat treatment with a heat-resistant tape or other thermal barrier, to help insulate portions of the vessel not designated for heat treatment from externally-applied heat. Suppliers for insulating materials suitable for the purposes described herein include ADL Insulflex, Inc. of Ontario, Canada, and Flextech Engineering, Inc. of Glendora, Calif.

Referring again to FIGS. 1 and 2, in one example of a method of fabricating the pressure vessel, an insulating material is positioned over portions 12b of vessel 12 (FIG. 1) and portion 14b of vessel 14 (FIG. 2), respectively, prior to heat treatment. The vessels 12 and 14 are then treated so as to impart the desired properties to the exposed portion(s) 12a, 14a, and 14c of the vessels.

For example, in the vessel shown in FIG. 1, portion 12a of the vessel resides proximate an end of the vessel at which a fluid release control mechanism (not shown) is welded or otherwise suitably secured. Vessel 12 may be heat-treated so that portion 12a of the vessel has a relatively higher tensile and/or yield strength and portion 12b has a relatively lower tensile and/or yield strength. Thus, in a straight-walled pressure vessel heat treated as shown in FIG. 1, an elevated pressure condition within the vessel will have a more pronounced effect on the relatively lower tensile and/or yield strength portion 12b of the vessel.

Figure 2:
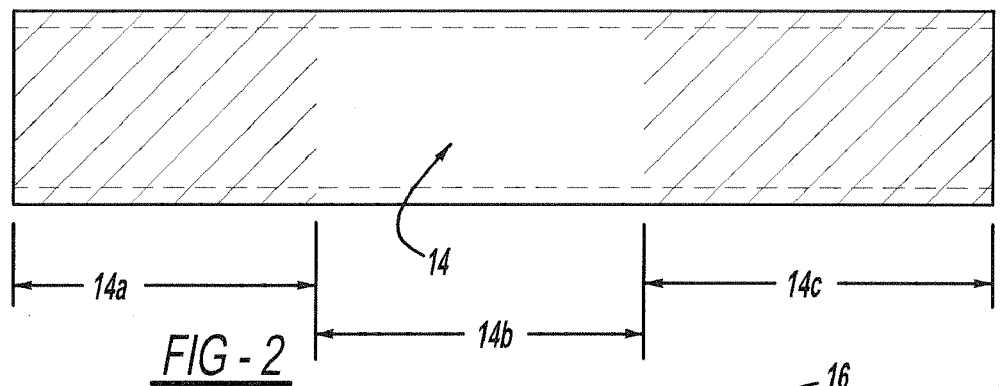
FIG. 2 is a side view of a pressure vessel in accordance with another embodiment of the present invention.
Figure 3:
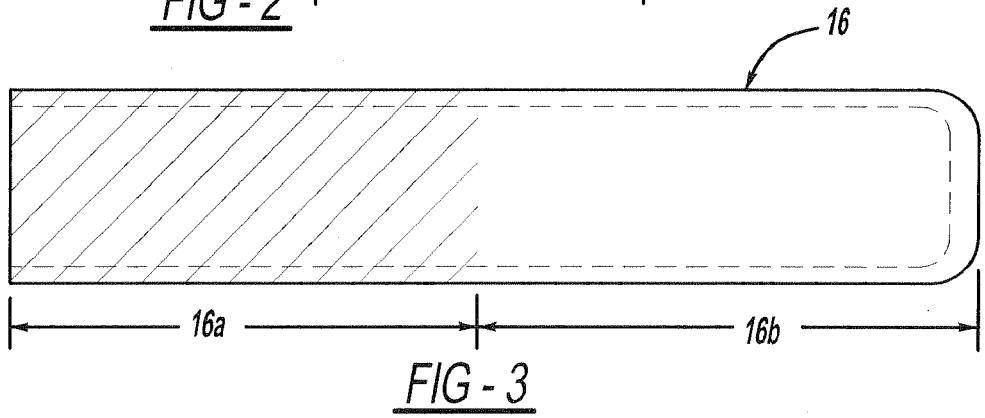
FIG. 3 is a side view of a pressure vessel in accordance with another embodiment of the present invention.
Figure 4:
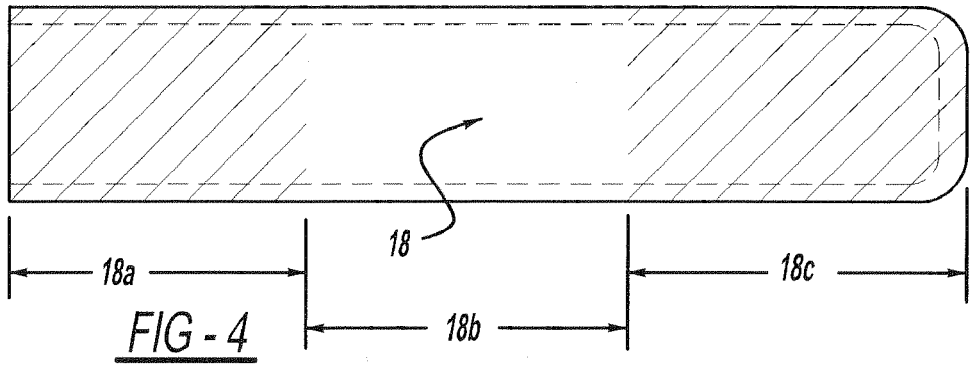
FIG. 4 is a side view of a pressure vessel in accordance with another embodiment of the present invention.

In the vessel shown in FIG. 2, portion 14a of the vessel resides proximate an end of the vessel at which a fluid release control mechanism is welded or otherwise suitably secured. Similarly, portion 14c of the vessel resides proximate an end of the vessel at which a pressure vessel end closure is welded or otherwise suitably secured. Vessel 14 may be heat-treated so that multiple portions 14a and 14c of the vessel have a relatively higher tensile and/or yield strength and portion 14b has a relatively lower tensile and/or yield strength. Thus, in a straight-walled pressure vessel heat treated as shown in FIG. 2, an elevated pressure condition within the vessel will have a more pronounced effect on the relatively lower tensile and/or yield strength portion 14b of the vessel. FIGS. 3 and 4 show vessels with closed ends formed therein during fabrication of the vessel. These vessels may be selectively heat treated as described above. In a particular embodiment, portions 18a and 18c of the vessel have values of tensile/and or yield strength falling within substantially the same range.

Alternatively, a heat treatment method and apparatus capable of providing the required degree of selective heating to the designated portion(s) of the vessels without the use of added insulating materials may be used. For example, an inductive heating process may be used for selectively heat treating the designated portions of the vessel. Any other suitable process may also be used.

Embodiments of the pressure vessel described herein may also have gas exit openings formed therealong to enable fluid communication between an interior of the vessel and an exterior of the vessel, thereby enabling a flow of generated gases into an airbag or other gas-actuatable element operatively coupled to the pressure vessel.

As stated previously, the applied heat treatment may be directed to affecting any of a variety of material properties, depending on the needs of a particular application. For example, operations suitable for strengthening selected portions of the vessel material may be employed, or operations directed to reducing the strength, increasing the hardness, or varying other properties of portions of the vessel may be employed.

Although the embodiments of the present invention are described herein with reference to a gas generating system having a cylindrically-shaped housing, it will be understood that the principles described herein may be applied to pressure vessels having other configurations. For example, methods such as finite element analysis may be utilized to identify portions of a given vessel structure subject to relatively high-stresses resulting from elevated vessel internal pressures. Then, portions of the vessel may be selectively heat-treated as previously described to either affect the properties in these high-stress regions, or to affect the properties in other portions of the vessel structure. This enables the stresses resulting from internal vessel pressure to be re-directed or redistributed to some degree, to aid in achieving a desired stress distribution in the pressure vessel material.

In another aspect of the embodiments of the present invention, a method is provided for controlling a material property of a selected portion of a pressure vessel for a gas generating system. The method includes the step of thermally treating the selected portion of the vessel such that a value of the material property resides within a predetermined range.

In one embodiment, a value of the material property for a portion of the vessel other than the selected portion has a value within a first range, and the step of thermally treating the selected portion of the vessel includes the step of thermally treating the selected portion of the vessel such that the value of the material property for the selected portion resides within a second range different from the first range.

In one embodiment, the step of thermally treating the selected portion of the vessel includes the step of applying a thermal barrier as previously described over portions of the vessel other than the selected portion to insulate the portions of the vessel other than the selected portion from heat applied during thermal treatment of the selected portion.

In a particular embodiment, the step of applying a thermal barrier over portions of the vessel other than the selected portion includes the step of applying a heat-resistant tape to the portions of the vessel other than the selected portion.

A pressure vessel produced in accordance with an embodiment of the method may be incorporated into a gas generating system or into a vehicle occupant protection system.

A pressure vessel in accordance with one of the above-described embodiments may be incorporated into a gas generating system 10 (FIG. 5), such as a stored gas or hybrid gas generating system or a system in which gas is generated by combustion of a gas generant material. The gas generating system may include elements and mechanisms (not shown) known in the art for facilitating operation of the gas generating system. For example, the system may include one or more end closures welded or otherwise suitably attached to the pressure vessel for sealing the vessel. An igniter or other actuator may be incorporated to initiate release of gas from the pressure vessel or production of gas inside the vessel. One or more filters or baffles may be provided if needed for cooling generated gases. The system may include a mechanism for facilitating controlled, on-demand release of a pressurized fluid stored in the pressure vessel. The system may also include means for directing the flow of gases and/or pressurized fluid within the system and from the system interior to the system exterior. The system may also include any additional elements needed or desired for facilitating generation, release, and/or direction of gases from the pressure vessel to an associated gas-actuatable element operatively coupled to the gas generating system, depending on the requirements of a particular application.

Figure 5:
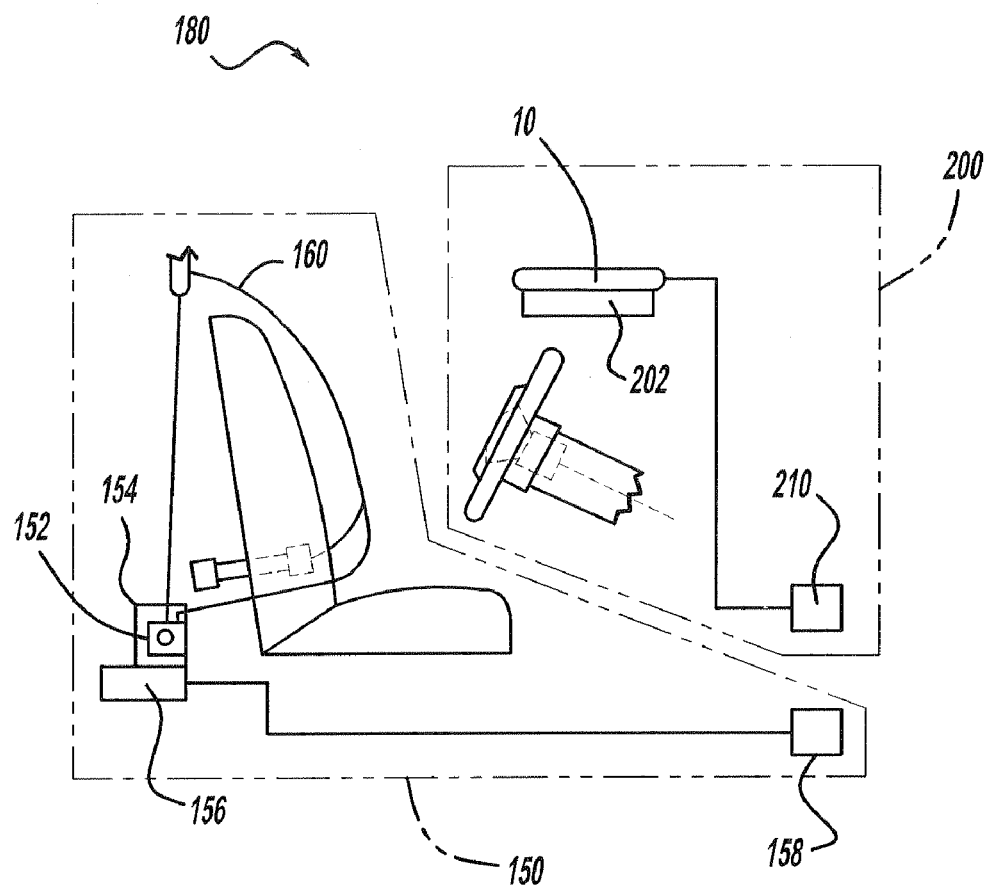
FIG. 5 is a schematic representation of an exemplary vehicle occupant protection system incorporating a pressure vessel in accordance with an embodiment of the present invention.

A gas generating system 10 including an embodiment of the pressure vessel described herein may be incorporated into an airbag system 200, as seen in FIG. 5. Airbag system 200 includes at least one airbag 202 and a gas generating system 10 incorporating a pressure vessel in accordance with an embodiment described herein. The gas generating system 10 is coupled to airbag 202 so as to enable fluid communication with an interior of the airbag upon activation of the gas generating system. Airbag system 200 may also include (or be in communication with) a crash event sensor 210 including a known crash sensor algorithm that signals actuation of airbag system 200.

Referring again to FIG. 5, an embodiment of the pressure vessel, a gas generating system including an embodiment of the pressure vessel, or an airbag system including an embodiment of the pressure vessel may be incorporated into a broader, more comprehensive vehicle occupant restraint system 180 including additional elements such as a safety belt assembly 150, as seen in FIG. 5. Safety belt assembly 150 includes a safety belt housing 152 and a safety belt 160 in accordance with the present invention extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may include (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing description of an embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A unitary pressure vessel for a gas generating system, the vessel being formed from a material and having a first portion and a second portion, wherein a property of the material along the first portion has a value within a first range, and the same property of the material along the second portion has a value within a second range different from the first range.

2. The pressure vessel of claim 1 wherein at least one of the first portion and the second portion is selectively thermally treated so as to control the property of the material such that it has the value within a corresponding one of the first range and the second range.

3. A gas generating system comprising a pressure vessel in accordance with claim 1.

4. A vehicle occupant protection system comprising a pressure vessel in accordance with claim 1.

5. The pressure vessel of claim 1 wherein the property of the material is yield strength.

6. The pressure vessel of claim 1 wherein the property of the material is tensile strength.

7. The pressure vessel of claim 1 wherein the property of the material is percent elongation.

8. The pressure vessel of claim 1 further comprising a third portion, and wherein the property of the material along the third portion has a value within a third range different from the first range.

9. The pressure vessel of claim 8 wherein the third range is substantially the same as the second range.

* * * * *

UNITED STATES PATENT AND TRADEMARK OFFICE
CERTIFICATE OF CORRECTION

| | | |
|---|---|---|
| PATENT NO. | : 8,196,956 B1 | Page 1 of 1 |
| APPLICATION NO. | : 12/696020 | |
| DATED | : June 12, 2012 | |
| INVENTOR(S) | : Krupp et al. | |

It is certified that error appears in the above-identified patent and that said Letters Patent is hereby corrected as shown below:

Col. 1, Line 60, Delete "forging" and Insert --forming--.

Signed and Sealed this
Eleventh Day of September, 2012

David J. Kappos
*Director of the United States Patent and Trademark Office*